US008612449B1

(12) United States Patent
Cuthbert (10) Patent No.: US 8,612,449 B1
(45) Date of Patent: Dec. 17, 2013

(54) CONTRIBUTOR-PROVIDED ITEM ATTRIBUTES

(75) Inventor: David A. Cuthbert, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/968,364

(22) Filed: Dec. 15, 2010

(51) Int. Cl.
G06F 7/00 (2006.01)
G06F 17/30 (2006.01)

(52) U.S. Cl.
USPC .......................................... 707/740

(58) Field of Classification Search
None
See application file for complete search history.

(56) References Cited

U.S. PATENT DOCUMENTS

| | | | | |
|---|---|---|---|---|
| 7,308,425 | B2 * | 12/2007 | Bezos et al. | 705/26.3 |
| 7,363,372 | B2 * | 4/2008 | Potenzone et al. | 709/225 |
| 7,428,496 | B1 * | 9/2008 | Keller et al. | 705/7.39 |
| 8,046,237 | B1 * | 10/2011 | King et al. | 705/26.1 |
| 2007/0255702 | A1 * | 11/2007 | Orme | 707/5 |

OTHER PUBLICATIONS

Amazon.com: Where the Wild Things Are: Books: Maurice Sendak Apr. 29, 2009 [accessed May 8, 2012], Amazon.com, http://web.archive.org/web/20090429214442/http://www.amazon.com/Where-Wild-Things-Maurice-Sendak/dp/0060254920.*
Amazon.com: Advanced Search—sendak: Books accessed May 8, 2012, Amazon.com, http://liveweb.archive.org/http://www.amazon.com/s?ie=UTF8&field-language=&field-dateyear=2007&field-publisher=&field-isbn=&field-datemod=0&field-binding=&field-3dateop=before&rh=n%/3A283155%2Cp_45%3A0%2Cp_46%3Abefore%2Cp_47%3A2007%2Cp_57%3Asendak&field-age=&page=1.*
Amazon.com: Advanced Search: Books. Dec. 4, 2006 [Accessed May 8, 2012], Amazon.com, http://web.archive.org/web/20061204042500/http://www.amazon.com/b?ie=UTF8&node=241582011.*
Amazon.com, Apr. 20, 2009 [accessed May 8, 2012], Amazon.com, http://web.archive.org/web/20091214051022/http://www.amazon.com/.*
Amazon.com: Where the Wild Things Are: Books: Maurice Sendak Nov. 23, 2006, Amazon.com, http://web.archive.org/web/20061123072027/http://www.amazon.com/Where-Wild-Things-Maurice-Sendak/dp/0060254920.*
Girl Scout Cookies and Wolf Urine—WTF! Mar. 31, 2009, methodshop.com, http://www.methodshop.com/archive/2009_03_01_archive.shtml.*
Parasuraman et al., A Model of Types and Human Interaction with Automation May 2000, IEEE Transaction on systems, Man, and Cypernetics, vol. 30 No. 3, pp. 286-297.*

* cited by examiner

Primary Examiner — Jason Liao
(74) Attorney, Agent, or Firm — Thomas Horstemeyer, LLP (57) ABSTRACT

Disclosed are various embodiments for using contributor-provided attributes in conjunction with an electronic item catalog. A request is received from a catalog user to obtain information an item in a catalog of items. Responsive to the request, the catalog is queried to obtain a plurality of attributes associated with the item. The attributes include at least one operator-controlled attribute and at least one contributor-provided attribute. A page is generated for display to the catalog user. The page includes the at least one operator-controlled attribute and at least one contributor-provided attribute.

19 Claims, 7 Drawing Sheets

CONTRIBUTOR-PROVIDED ITEM ATTRIBUTES

BACKGROUND

An electronic commerce system operated by an online merchant allows users to purchase products online. The products are organized in a catalog. The user can search for products by attributes, and can also view attributes for a particular product. In conventional electronic commerce systems, the attributes are controlled by the operator of the electronic commerce system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to items in an electronic catalog, such as an electronic product catalog, and more specifically, to using contributor-provided item attributes in an electronic catalog. Conventional electronic catalogs are limited in that the catalog owner/operator controls the catalog items, including item attributes. One example of operator control over the catalog is the ability to add or remove items from the catalog. Another example of operator control over the catalog is the ability to enter attributes into the catalog. Operator entry of item attributes is a form of direct control over catalog items. The catalog operator may also exercise indirect control, in that vendors or providers of catalog items submit attributes for entry into the catalog. In this indirect case, the catalog operator has control in that the vendor has a contractual relationship with the catalog operator. Users of the catalog may have additional ideas about other attributes they would like to see in the catalog that are not being provided by the catalog operator. Embodiments described herein allow users, referred to herein as contributors, to submit attributes and values which may be free-form text. Embodiments described herein also allow users to see the contributor-provided attributes as well as operator-controlled attributes when viewing items in the catalog.

Figure 1:
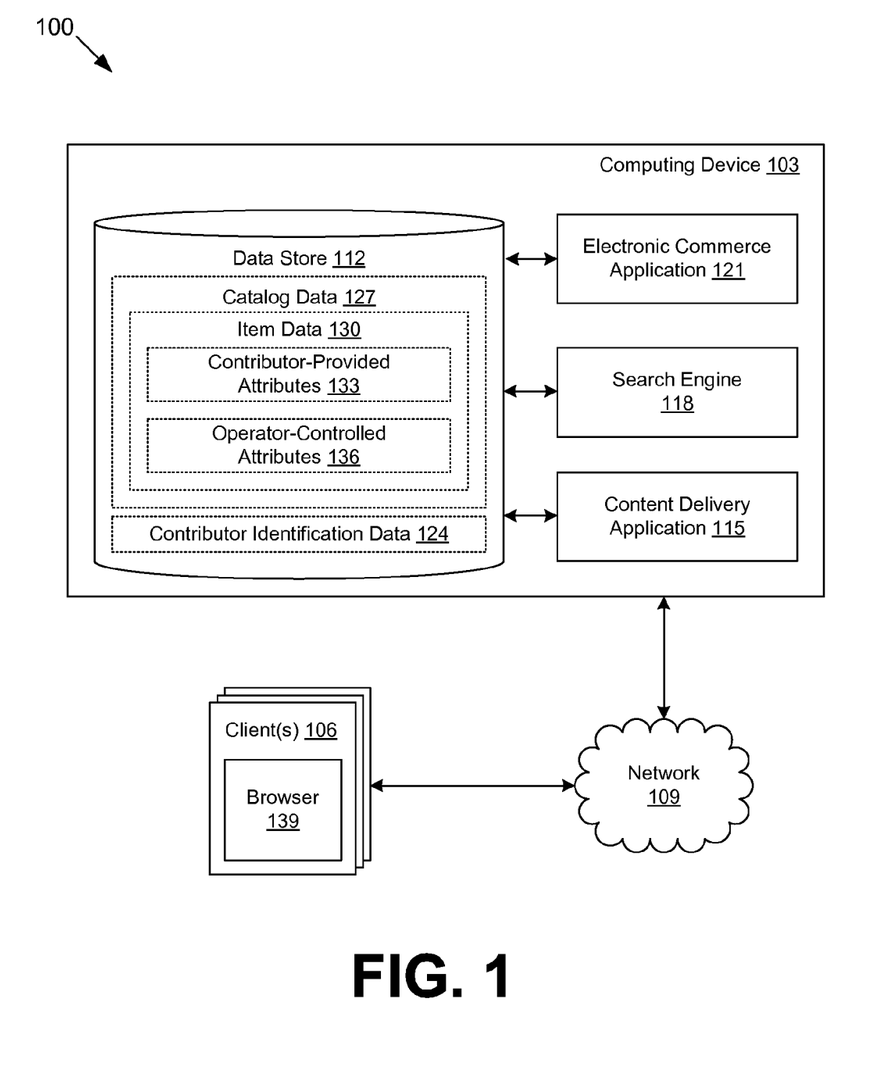
FIG. 1 is a drawing of a networked environment according to one embodiment of the disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103 include, for example, a content delivery application 115 and a search engine 118. In some embodiments, the computing device 103 also includes an electronic commerce application 121. The components executed on the computing device 103 may also include other applications, services, processes, systems, engines, or functionality not discussed in detail herein. The data stored in the data store 112 includes data accessed by the components executing on the computing device 103, for example, contributor identification data 124 and catalog data 127, as well as potentially other data. Catalog data 127 contains item data 130, where each item includes searchable attributes. These attributes include attributes 133 which are provided by individual contributors as well as attributes 136 which are provided by the catalog operator.

The content delivery application 115 is executed to collect and process information relating to user submitted queries regarding catalog items and/or catalog categories. The content delivery application 115 facilitates a user seeking information about a catalog item by leveraging item attributes 133 that are submitted by outside contributors in addition to item attributes 136 that are controlled by the catalog operator.

The search engine 118 is executed to find an item in catalog data 127 using a search query. In some embodiments, the content delivery application 115 and the search engine 118 may utilize any type of middleware framework to communicate with each other. In some embodiments, the functionality of the search engine 118 may be included in the content delivery application 115.

To provide content in response to user queries, content associated with item(s) retrieved by a query may be retrieved from the catalog data 127 and encoded for display in a client device 106 by the content delivery application 115. To this end, the content delivery application 115 may include network page server functionality, such as a hypertext transfer protocol (HTTP) server. Alternatively, the content delivery application 115 may be in data communication with one or more distinct server applications.

The electronic commerce application 121 is executed in order to facilitate the online viewing and/or purchase of items and products over the network 109. The electronic commerce application 121 also performs various backend functions associated with the online presence of a merchant in order to facilitate the online purchase of items as should be appreciated. In embodiments which include the electronic commerce application 121, the catalog of items comprises a product catalog of items offered for sale, so that item data 130 comprises product data.

As noted above, item data 130 includes attributes, both operator-controlled attributes 136 and contributor-provided attributes 133. Each attribute is associated with one or more values. The operator-controlled attributes 136 may include, but are not limited to, product category, title, description, price, weight, shipping methods, images, reviews, similar items, stock number, other associated categories, page view history, etc. Some item attributes have a single value at any point in time (e.g., price or weight) while other item attributes may be multi-valued (e.g., shipping method). Still other item attributes may not have a value at all. Some item attributes are limited to a set of enumerated values (e.g., hardback, trade paperback, mass-market paperback, or electronic book) while other item attributes are freeform and unconstrained (e.g., title).

As the name suggests, the operator-controlled attributes 136 are entered by and controlled by the catalog operator. Where the number and variety of operator-controlled attributes 136 is limited by the catalog operator's time and resources, the contributor-provided attributes 133 are submitted by third parties and so the number and variety of such attributes is not so limited. Because these contributor-provided attributes 133 are searchable in the same way as operator-controlled attributes 136, customers using the electronic commerce system are better able to find products of interest. In some embodiments, the catalog operator exercises little control over the contributor-provided attributes 133 and relies on contributor ratings to minimize the impact of irrelevant, incorrect, misleading, or even malicious information within the contributor-provided attributes 133. In some embodiments, the operator may promote a contributor-provided attribute 133 to become an operator-provided attribute 136, in response to the contributor-provided attribute 133 being viewed by a minimum number of catalog users, to the contributor-provided attribute 133 receiving a minimum number of favorable votes or ratings, or some other suitable criteria.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a browser 139 and other applications. The browser 139 may be executed in a client device 106, for example, to access and render network pages, such as web pages, or other network content served up by the content delivery application 115. The client device 106 may be configured to execute applications beyond browser 139 such as, for example, email applications, instant message applications, and/or other applications.

Next, a general description of the operation of the various components of the networked environment 100 is provided. To begin, a contributor submits an attribute, with at least one corresponding value, to the content delivery application 115. The attribute is associated with a particular item in the catalog 127, and this item is identified in the submission. The submission also identifies the contributor, for example, by a user name, login name, etc. In some embodiments, the contributor uses a browser 139 to navigate to a network site maintained by the catalog operator, and submits the attribute by filling out a form on the network site.

The content delivery application 115 parses the submission to identify the product and extract the attribute-value pairs. In some embodiments, the content delivery application 115 may perform some level of error checking on submitted attributes. After such analysis, the content delivery application 115 may suggest possible corrections to the contributor. For example, "weight" may be a suggested correction for "mass." Having identified the product, the content delivery application 115 then locates the item data 130 for that product in the data store 112, and stores the data as a contributor-provided attribute 133 for that item. In some embodiments, the content delivery application 115 may normalize the data before storing. The content delivery application 115 also obtains the identity of the contributor from the submission and stores this data as contributor identification data 124 in the data store 112.

The content delivery application 115 continues to handle contributor submissions, some of which may be for the same catalog items. Thus, over time, the item data 130 includes multiple contributor-provided attributes 133 for the same catalog item. The contributor identification data 124 allows the content delivery application 115 to obtain the identity of the contributor who provided each contributor-provided attribute 133.

Next, a user at a client device 106 uses a browser 139 to navigate to the catalog operator's network site. The content delivery application 115 serves up network pages as the user browses and/or navigates through the site. The user submits a search query which describes an item that includes a contributor-provided attribute 133. The search engine 118 handles the query and informs the content delivery application 115 of any matches for the search criteria. The content delivery application 115 generates a network page describing the matching items, from which the user selects a particular item and requests details about the selected item.

In response to the item detail request, the content delivery application 115 generates a network page including details for a specific item. In doing so, the content delivery application 115 determines whether the catalog item includes contributor-provided attributes 133. If so, content delivery application 115 may include one or more of those contributor-provided attributes 133 on the network page, depending on user-defined filter settings. For example, a particular catalog user may choose to view all contributor-provided attributes 133, no contributor-provided attributes 133, or some subset thereof. The filter may be based on a contributor rating or score which is maintained in the contributor identification data 124 in the data store 112. Filters and ratings are discussed in more detail below.

Figure 2:
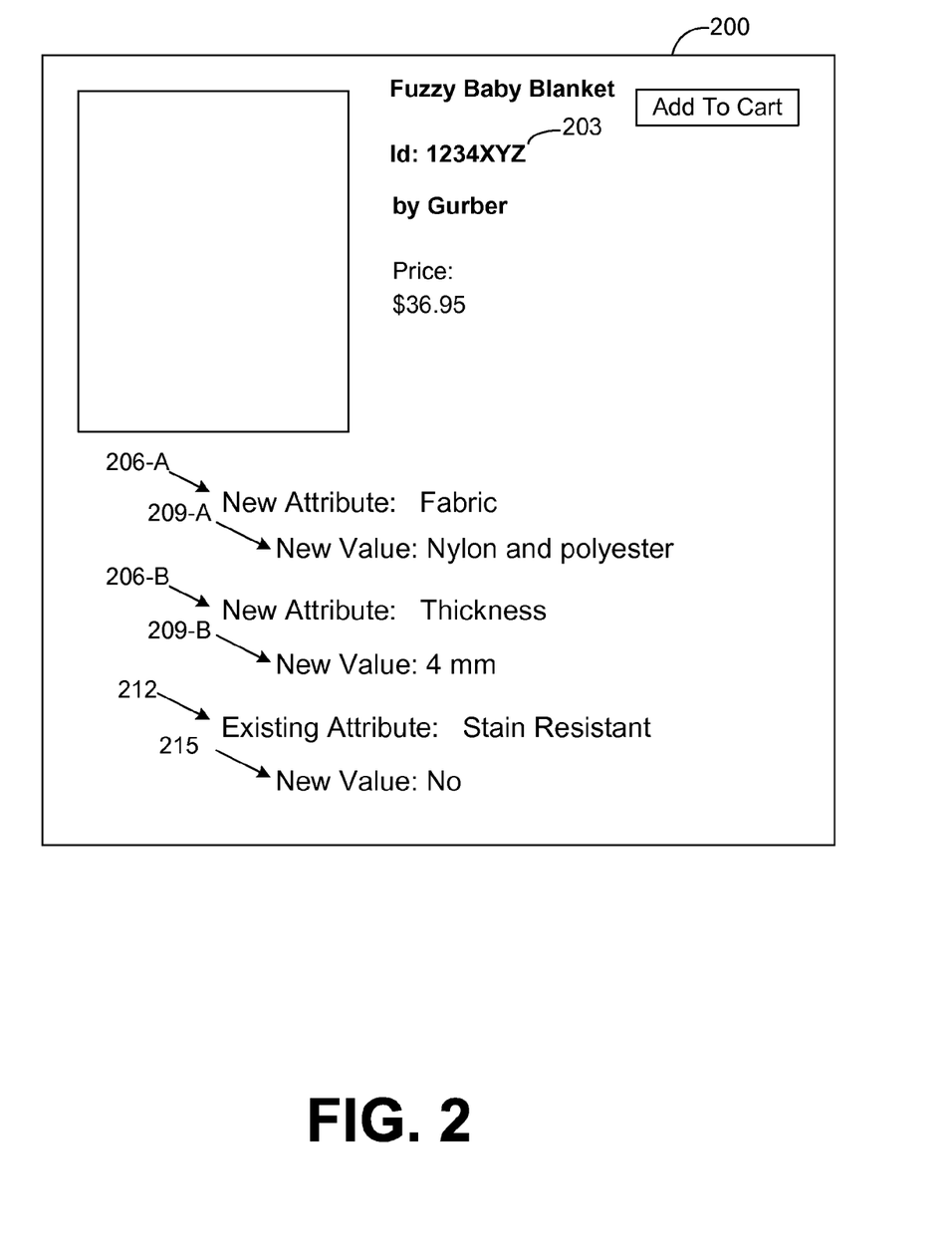
FIG. 2 is a drawing of one example of a user interface rendered by a client in the networked environment of FIG. 1 according to various embodiments of the present disclosure.

Referring next to FIG. 2, shown is one example of a user interface 200 that can be generated by the content delivery application 115 (FIG. 1). The user interface 200 allows a contributor to submit one or more attributes for a particular item within the catalog 127. Though not shown in FIG. 2, the contributor provides an identifier before the page is submitted. This identifier may be obtained, for example, by a login process in which the contributor enters a login identifier and password. The depicted user interface 200 can be rendered by a browser 139 (FIG. 1) executing in a client device 106 (FIG. 1) in the networked environment 100 (FIG. 1) according to various embodiments of the present disclosure. The depicted user interface 200 is shown in the context of a electronic commerce application 121 operating in conjunction with the content delivery application 115. However, it should be appreciated that other contexts can be employed in accordance with the disclosure, such as, a search engine, a social network application, etc.

The user interface 200 includes a catalog item identifier 203, here, "1234XYZ." In some embodiments, the user interface 200 may be reached, for example, when a user clicks on a link in a detail page for the identified catalog item, where that detail page may have been reached by a product search query, by browsing through categories, etc. When the page was reached by following links associated with one catalog item, the catalog item identifier 203 is not entered by the user, but is pre-populated on the page by the content delivery application 115. The user interface 200 may also include additional descriptive information about the catalog item.

The user interface 200 includes at least one attribute text field 206 and an associated value text field 209. In this example, the catalog item identifier 203 refers to a baby blanket and the contributor enters two attributes. In the first attribute text field 206-A, the contributor enters the string "Fabric" and enters the string "Nylon and polyester" for the value text field 209-A. In the second attribute text field 206-B, the contributor enters the string "Thickness" and enters the string "4 mm" for the value text field 209-B.

The user interface 200 may also allow a contributor to add values to existing contributor-provided attributes 133, i.e., to those attributes provided by other contributors. In this example, the user can type in a new attribute to the attribute text field 212 for the existing attribute "Stain Resistant" 215. In other embodiments (not shown), the user interface 200 displays suggested contributor attributes, based on the product type. For example, an appropriate suggestion for a television might be "viewable in bright light." In such embodiments, the contributor is then prompted to enter a value for the suggested attribute.

In some embodiments, the catalog operator may reward a contributor for submitting a contributor-provided attribute 133. The reward may take the form of a monetary payment, a credit with the electronic commerce merchant, or other suitable reward schemes. In one embodiment, contributor-provided attributes 133 are not provided to all viewers of the catalog data 127, but are instead provided to a subset of catalog viewers through a subscription service. In such an embodiment, the reward to the contributor may be funded by subscription service payments.

Figure 3:
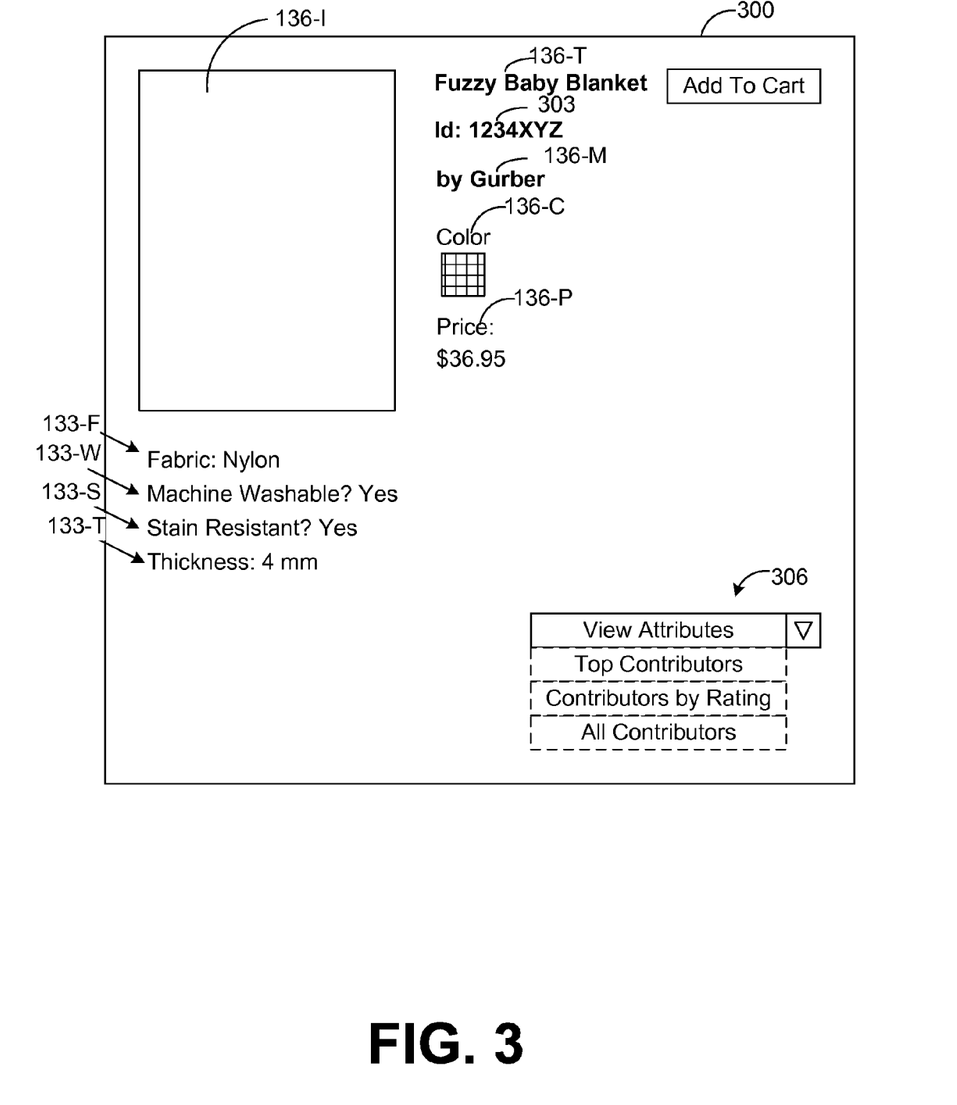
FIG. 3 is a drawing of another example of a user interface rendered by a client in the networked environment of FIG. 1 according to various embodiments of the present disclosure.

Moving on to FIG. 3, shown is one example of a user interface 300 that can be generated by the content delivery application 115 (FIG. 1). The user interface 300 is an item detail page which provides details about a particular item in catalog 127, as introduced above. The depicted user interface 300 can be rendered by a browser 139 (FIG. 1) executing in a client device 106 (FIG. 1) in the networked environment 100 (FIG. 1) according to various embodiments of the present disclosure. The depicted user interface 300 is shown in the context of an electronic commerce application 121 operating in conjunction with the content delivery application 115. However, it should be appreciated that other contexts can be employed in accordance with the disclosure, such as, a search engine, a social network application, etc.

The user interface 300 includes a catalog item identifier 303 and attributes that describe the item. The attributes include one or more operator-controlled attributes 136 as well as one or more contributor-provided attributes 133, if such contributor-provided attributes are present in the item data 130 associated with the catalog item identifier 303. In this embodiment, there is no visual distinction between contributor-provided attributes 133 and operator-controlled attributes 136. In other embodiments, the operator-controlled attributes 136 may be presented in a manner which distinguishes them from contributor-provided attributes 133, for example, in a different font, a specially identified location on the page, etc. In this example user interface 300, the contributor who provided a particular attribute and/or value is not identified, although such information is present in the contributor identification data 124.

In this example, the catalog item identifier 303 is the baby blanket "1234XYZ," and the operator-provided attributes are product title 136-T, manufacturer 136-M, product image 136-I, color 136-C, and price 136-P. The contributor-provided attributes are fabric 133-F, thickness 136-N, machine-washable 136-W, and stain-resistant 136-S.

The user interface 300 also includes a contributor filter 306 element, which allows the viewer to control which contributor-provided attributes 133 are displayed on the page. The contributor filter 306 may include an "all contributors" option, so that attributes for all contributors are shown, i.e., there is no filtering. In some embodiments, the "all contributors" option is the default. Other options for the contributor filter 306 may include, for example, all contributors having a rating above a specific value (e.g. 75%), all contributors having more than a specific number of contributions (e.g., 100), or some combination thereof. In yet another embodiment, the contributor filter 306 allows a viewer to include or exclude specific contributors.

Figure 4:
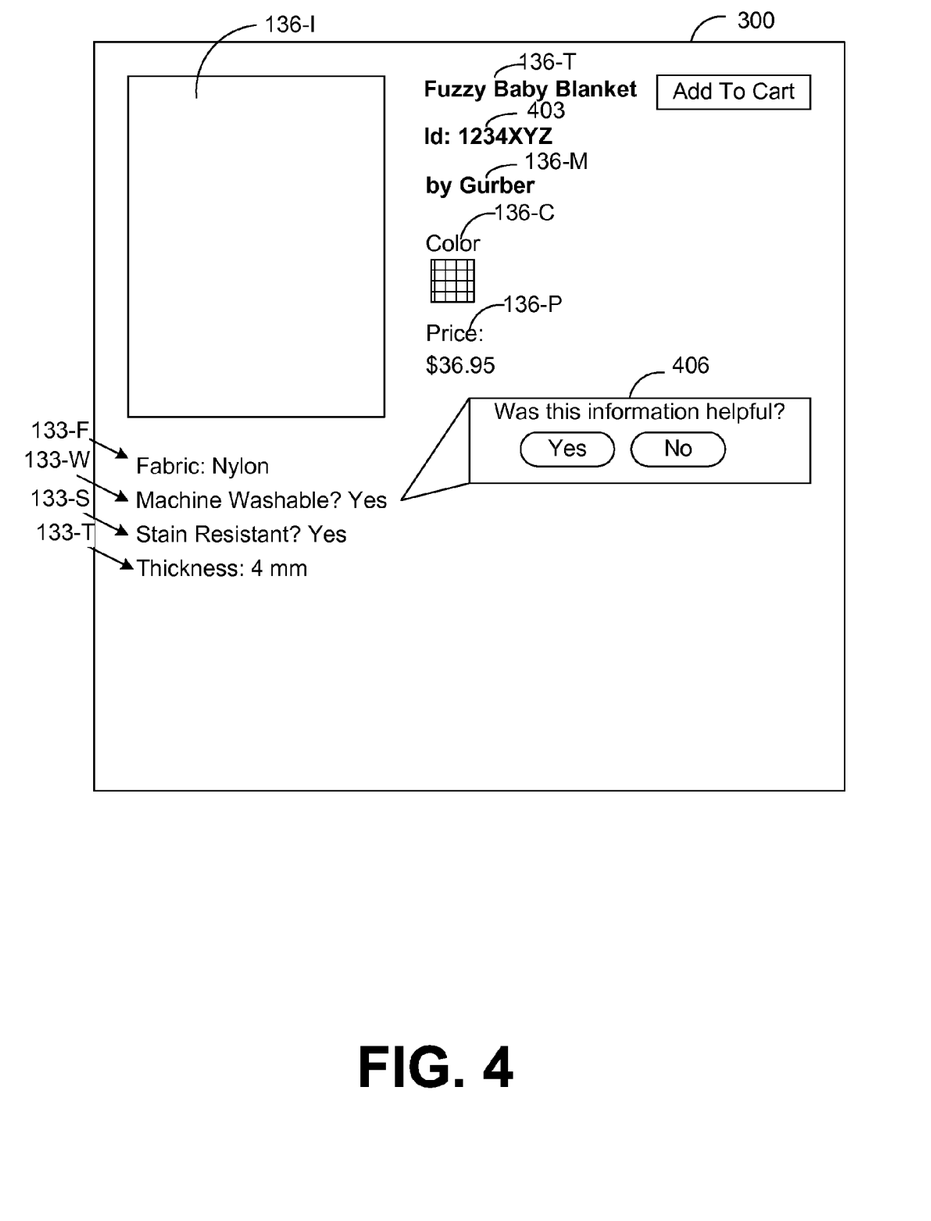
FIG. 4 is a drawing of yet another example of a user interface rendered by a client in the networked environment of FIG. 1 according to various embodiments of the present disclosure.

With reference now to FIG. 4, shown is one example of a user interface 400 that can be generated by the content delivery application 115 (FIG. 1). The user interface 400 allows a user who is viewing the catalog data 127 for an item with contributor-provided attributes 133 to vote on, or rate, a contributor. The depicted user interface 400 can be rendered by a browser 139 (FIG. 1) executing in a client device 106 (FIG. 1) in the networked environment 100 (FIG. 1) according to various embodiments of the present disclosure. The depicted user interface 400 is shown in the context of an electronic commerce application 121 operating in conjunction with the content delivery application 115. However, it should be appreciated that other contexts can be employed in accordance with the disclosure, such as, a search engine, a social network application, etc.

The user interface 400 includes a catalog item identifier 403, one or more operator-controlled attributes 136, and one or more contributor-provided attributes 133. The user interface 400 further includes a voting element 406 associated with a contributor-provided attributes 133. In some embodiments, the voting element 406 may not appear on the page by default, but may be displayed instead upon some user action, for example, hovering over a particular contributor-provided attribute 133. In this example, the voting element 406 asks the user the question "Was this information helpful to you?" and the element is implemented as a button for "Yes" and a button for "No." In other embodiments, the voting element 406 may support a numeric rating rather than a binary value.

In response to a user submitting a vote concerning a contributor-provided attribute 133, the content delivery application 115 uses the vote to modify the contributor's rating, stored in the contributor identification data 124. As described above, the content delivery application 115 uses the contributor rating to implement the contributor filter 306. In embodiments which have a simple binary vote, the content delivery application 115 may implement the rating using a count of positive votes and total votes. In embodiments which have a numeric rating, the content delivery application 115 may store an average of the received ratings and a total number of received ratings. In still other embodiments, the content delivery application 115 may store all the received ratings and possibly a submission time associated with each. In this manner, the content delivery application 115 can implement the contributor filter 306 to utilize only recent ratings, for example.

Figure 5:
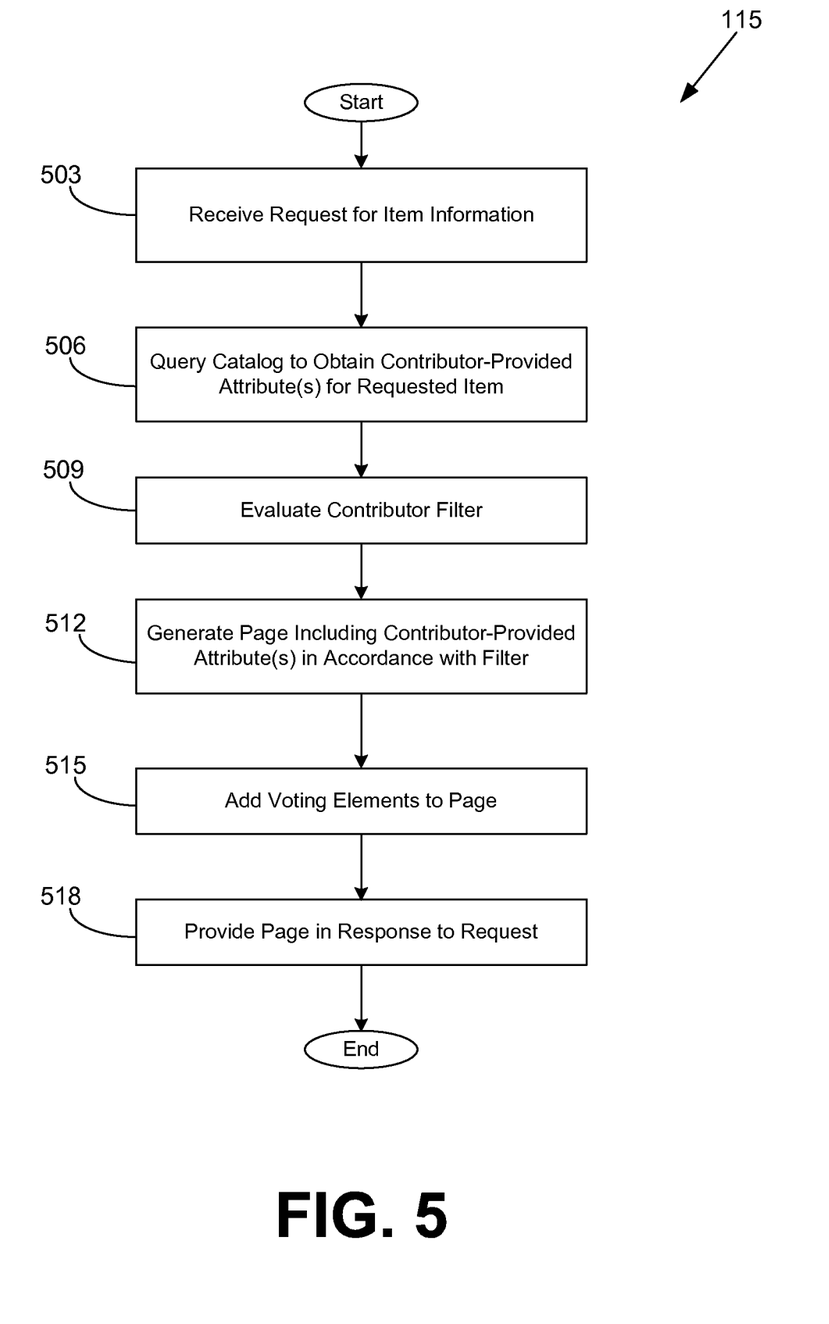
FIG. 5 is a flowchart illustrating an example of functionality implemented as portions of a content distribution application executed in a computing device in the networked environment of FIG. 1 according to various embodiments of the present disclosure.

Turning now to FIG. 5, shown is a flowchart that provides one example of the operation of a portion of the content delivery application 115 (FIG. 1) according to various embodiments. It is understood that the flowchart of FIG. 5 provides merely an example of the many different types of functional arrangements that may be employed to implement the operation of the portion of the content delivery application 115 as described herein. As an alternative, the flowchart of FIG. 5 may be viewed as depicting an example of steps of a method implemented in the computing device 103 (FIG. 1) according to one or more embodiments.

Beginning at box 503, the content delivery application 115 receives a request from a catalog user to obtain information about an item contained in the catalog data 127 (FIG. 1). The request includes a specific item identifier, which may be obtained through a search, navigation, browse, etc. At box 506, in response to the request, the content delivery application 115 queries the catalog data 127 to obtain one or more attributes associated with the item. As explained above, the attributes include operator-controlled attributes 136 (FIG. 1) and contributor-provided attributes 133 (FIG. 1). The content delivery application 115 proceeds to generate a network page including attributes associated with the item, as requested by the user. The process of generating this page will be now be described in connection with boxes 509 through 515.

The attributes are placed on the page in accordance with a contributor filter. In some embodiments, the filter is a user interface element associated with the page (e.g., the contributor filter 306 in FIG. 3). The filter may have a default value which is used the first time the page is generated, i.e., before the user has a chance to interact with the contributor filter 306 to set the value. In box 509, the content delivery application 115 evaluates the contributor filter to determine which of the contributor-provided attributes 133 are provided to the user. Various filter options were described above, such as filtering based on a minimum rating, filtering based on a minimum number of contributions, filtering based on the identity of the contributor, or other filter options.

In box 512, the content delivery application 115 generates the network page to include those contributor-provided attributes 133 that meet the filter criteria, and to exclude any contributor-provided attributes 133 that do not meet the filter criteria. The network page may also include other information, such as operator-controlled attributes 136 (e.g., product title, manufacturer, etc.) and a user interface "shopping cart" element which allows the user to set aside the identified item for future purchase.

At box 515, the content delivery application 115 adds to the network page a voting element 406 for each of the contributor-provided attributes 133 that are included on the page. As explained earlier, the voting element 406 allows the catalog user to provide feedback to the catalog operator about which contributor-provided attributes 133 are helpful and/or useful. The content delivery application 115 then incorporates the votes into the contributor rating, which in turn affects which contributor-provided attributes 133 are included on future network pages.

Finally, at box 518, the content delivery application 115 provides the dynamically generated network page to the catalog user who submitted the request for item information. The process of FIG. 5 is then complete.

Figure 6:
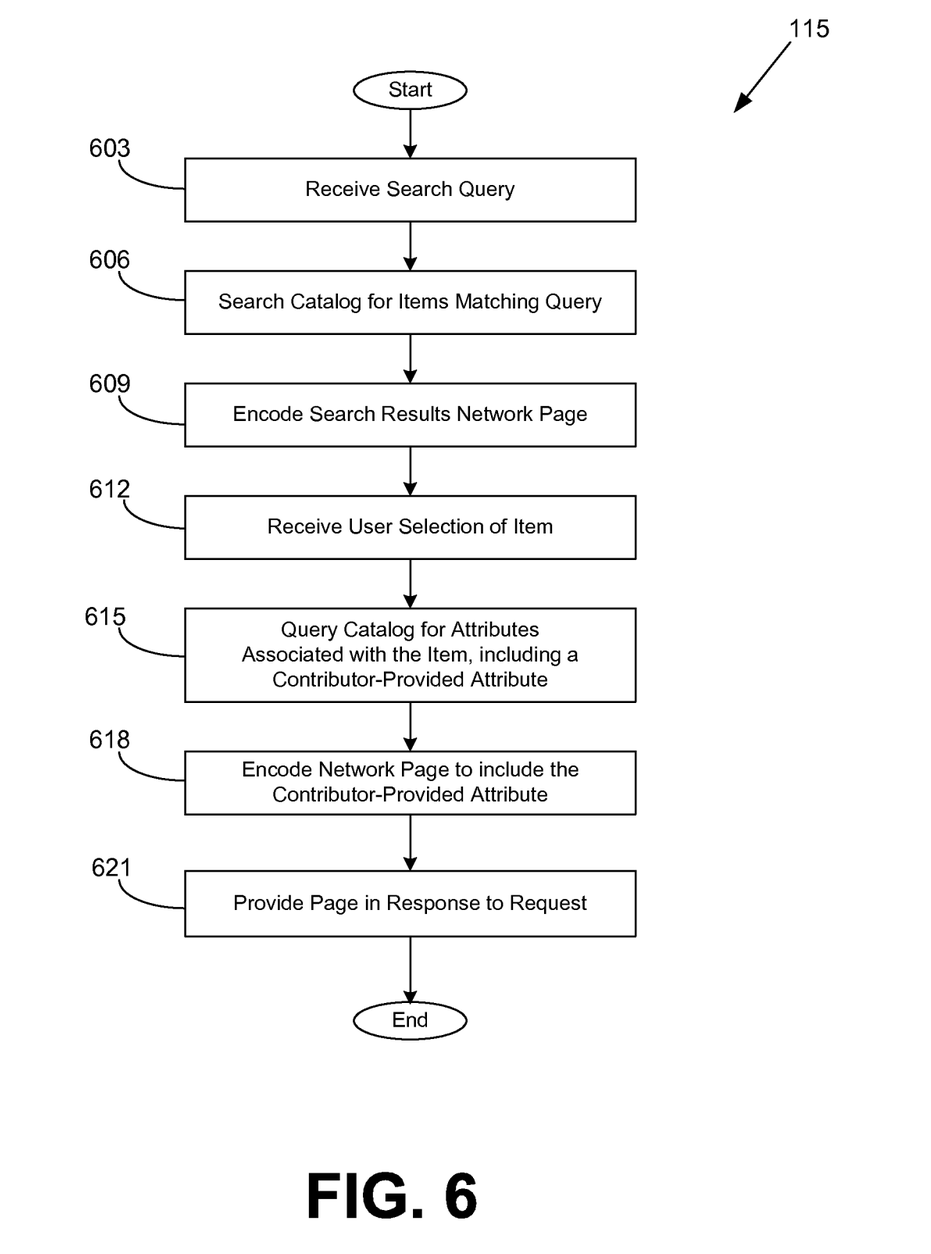
FIG. 6 is a flowchart illustrating another example of functionality implemented as portions of a content distribution application executed in a computing device in the networked environment of FIG. 1 according to various embodiments of the present disclosure.

With reference now to FIG. 6, shown is a flowchart that provides one example of the operation of a portion of the content delivery application 115 (FIG. 1) according to various embodiments. It is understood that the flowchart of FIG. 6 provides merely an example of the many different types of functional arrangements that may be employed to implement the operation of the portion of the content delivery application 115 as described herein. As an alternative, the flowchart of FIG. 6 may be viewed as depicting an example of steps of a method implemented in the computing device 103 (FIG. 1) according to one or more embodiments.

Beginning at box 603, the content delivery application 115 receives a search query from a catalog user. Next, at box 606, the content delivery application 115 searches the catalog data 127 (FIG. 1) for items matching the search query. The search produces a set of search results. At box 609, the content delivery application 115 encodes a search results page which includes the search results. The encoded page is suitable for rendering and/or display by a browser 139 (FIG. 1). At box 612, the content delivery application 115 receives from the catalog user a selection of one of the search results. Next, at box 615, the content delivery application 115 queries the catalog data 127 for contributor-provided attributes 133 and operator-controlled attributes 136 that are associated with the item selected by the catalog user. At box 618, the content delivery application 115 encodes a network page which includes item attributes. A particular contributor-provided attribute 133 is included on the page, or is excluded from the page, based on whether it meets the filter criteria, as explained above.

Finally, at box 621, the content delivery application 115 provides the dynamically generated network page to the catalog user which submitted the request for item information. The process of FIG. 6 is then complete.

Figure 7:
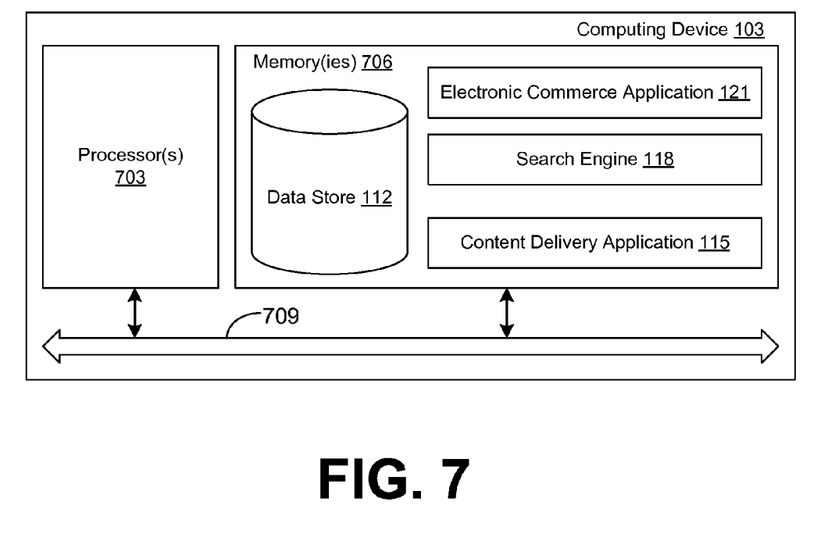
FIG. 7 is a schematic block diagram that provides one example illustration of a computing device employed in the networked environment of FIG. 1 according to various embodiments of the present disclosure.

Moving on to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the content delivery application 115, and potentially other applications. Also stored in the memory 706 may be a data store 112 and other data. In addition, an operating system may be stored in the memory 706 and executable by the processor 703. While not illustrated, the client device 106 also includes components like those shown in FIG. 7, whereby content delivery application 115 is stored in a memory and executable by a processor.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors and the memory 706 may represent multiple memories that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the content delivery application 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5 and 6 show the functionality and operation of an implementation of portions of the content delivery application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in flowcharts of FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery application 115, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that receives a search query for a catalog;
   code that initiates a search of the catalog for any items that match the search query, the search producing a plurality search results;
   code that encodes, for display, a search results page including information about the items that match the search query;
   code that receives~ from a device associated with a user, a selected one of the items that matches the search query;
   code that queries the catalog for a plurality of attributes associated with the selected item, the attributes including at least one operator-controlled attribute and at least one contributor-provided attribute;
   code that encodes, for display to the device associated with the user, a page including the at least one operator-controlled attribute and the at least one contributor-provided attribute;
   code that obtains, from the user, an identifier and a vote, the identifier and the vote each being associated with the at least one contributor-provided attribute on the page;
   code that updates a rating associated with the identifier, based on the vote;
   code that adds the at least one contributor-provided attribute to the page for display if the at least one contributor-provided attribute is included by a contributor filter;
   code that omits the at least one contributor-provided attribute from display in the page if the at least one contributor-provided attribute is excluded by the contributor filter; and
   wherein inclusion by the contributor filter is based on the rating, and wherein exclusion by the contributor filter is based on the rating.

2. The non-transitory computer-readable medium of claim 1, wherein the program further comprises:
   code that encodes for display a contributor submission page, the contributor submission page including an item identifier from the catalog, at least one attribute field, and at least one value field associated with the at least one attribute field.

3. The non-transitory computer-readable medium of claim 1, wherein the identifier is obtained from the user in response to the user selecting a link included in the page.

4. A method, comprising:
   receiving a request in a computer system from a catalog user to obtain information about an item in a catalog of items;
   responsive to the request, querying the catalog to obtain a plurality of attributes associated with the item, the attributes including at least one operator-controlled attribute and at least one contributor-provided attribute;
   generating a page including the at least one operator-controlled attribute and further including the at least one contributor-provided attribute;
   obtaining, from the catalog user, a contributor identifier associated with the at least one contributor-provided attribute; and
   updating a rating associated with the contributor identifier, the rating based at least in part on a vote by the catalog user;
   if the at least one contributor-provided attribute is permitted to be displayed included by a contributor filter, including the at least one contributor-provided attribute for display in the page;
   if the at least one contributor-provided attribute is excluded by the contributor filter, omitting the at least one contributor-provided attribute from display in the page; and
   wherein inclusion by the contributor filter is based on the rating, and wherein exclusion by the contributor filter is based on the rating.

5. The method of claim 4, wherein the generating further comprises populating the page with a suggested contributor-provided attribute based at least in part on the item.

6. The method of claim 4, wherein the generating further comprises encoding for display a voting element, the voting element allowing the catalog user to vote whether the at least one contributor-provided attribute is useful.

7. The method of claim 4, further comprising step of generating a contributor submission page, the contributor submission page including an item identifier from the catalog, at least one attribute field, and at least one value field associated with the at least one attribute field.

8. The method of claim 4, further comprising:
   receiving from a contributor an item identifier, the at least one contributor-provided attribute, and an associated attribute value; and
   storing the at least one contributor-provided attribute and the associated attribute value in association with the item identifier.

9. The method of claim 8, further comprising receiving information identifying the contributor.

10. The method of claim 8, further comprising normalizing the associated attribute value before the storing.

11. The method of claim 8, further comprising:
    analyzing the at least one contributor-provided attribute; and
    providing, to the contributor, a suggested correction to the at least one contributor-provided attribute based on the analysis.

12. The method of claim 4, wherein the at least one operator-controlled attribute is a first at least one operator-controlled attribute, further comprising logic that promotes the at least one contributor-provided attribute to a second at least one operator-controlled attribute responsive to the at least one contributor-provided attribute being associated with a predefined number of favorable votes.

13. The method of claim 4, wherein the contributor filter is defined by the catalog user.

14. The method of claim 4, wherein the at least one contributor-provided attribute is included by the contributor filter responsive to a contributor associated with the at least one contributor-provided attribute having a number of contributions exceeding a threshold.

15. A system, comprising:
an item catalog;
at least one computing device; and
a content delivery application implemented in the at least one computing device, the content delivery application comprising:
- logic that receives from a contributor an item identifier, at least one contributor-provided attribute, and an associated attribute value, the item identifier being included within the item catalog;
- logic that stores, in the item catalog, at least one contributor-provided attribute and the associated attribute value in association with the item identifier;
- logic that uses the at least one contributor-provided attribute to perform a catalog query from a catalog user;
- logic that obtains, from the catalog user, an identifier associated with the at least one contributor-provided attribute;
- logic that updates a rating associated with the identifier, the rating based at least in part on a vote by the catalog user;
- logic that includes the at least one contributor-provided attribute for display in a network page embodying the item if the at least one contributor-provided attribute included by a contributor filter; and
- logic that excludes the at least one contributor-provided attribute from display in the network page if the at least one contributor-provided attribute is excluded by the contributor filter; and
- wherein inclusion by the contributor filter is based on the rating, and wherein exclusion by the contributor filter is based on the rating.

16. The system of claim 15, further comprising logic that normalizes the associated attribute value before the associated attribute value is stored.

17. The system of claim 15, further comprising:
- logic that analyzes the at least one contributor-provided attribute; and
- logic that provides, to the contributor, a suggested correction to the at least one contributor-provided attribute based on the analysis.

18. The system of claim 15, further comprising logic that encodes for display a contributor submission page, the contributor submission page including an item identifier from the catalog, at least one attribute field, and at least one value field associated with the at least one attribute field.

19. The system of claim 15, further comprising logic that encodes, for display to a catalog user, a page including the at least one contributor-provided attribute, the encoding being performed in response to the catalog query.

* * * * *